(12) United States Patent
Policar (10) Patent No.: US 7,760,494 B2
(45) Date of Patent: Jul. 20, 2010

(54) FLAT SCREEN DISPLAY DEVICE

(75) Inventor: Jean-Michel Policar, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 7 days.

(21) Appl. No.: 11/990,723

(22) PCT Filed: Aug. 24, 2006

(86) PCT No.: PCT/EP2006/065655

§ 371 (c)(1),
(2), (4) Date: Feb. 27, 2009

(87) PCT Pub. No.: WO2007/060039

PCT Pub. Date: May 31, 2007

(65) Prior Publication Data

US 2009/0308997 A1    Dec. 17, 2009

(30) Foreign Application Priority Data

Sep. 1, 2005    (FR)    ................................ 05 52651

(51) Int. Cl.
*G06F 1/16* (2006.01)
(52) U.S. Cl. ................................ 361/679.23; 248/918
(58) Field of Classification Search ............ 361/679.21, 361/679.23
See application file for complete search history.

(56) References Cited

U.S. PATENT DOCUMENTS

| 2,505,615 | A | | 4/1950 | Glass | |
|---|---|---|---|---|---|
| 4,955,873 | A | | 9/1990 | Rajlevsky | |
| 5,852,545 | A | * | 12/1998 | Pan-Ratzlaff | 361/679.23 |
| 5,880,928 | A | * | 3/1999 | Ma | 361/679.23 |
| 6,040,978 | A | * | 3/2000 | Spencer | 361/679.23 |
| 6,151,206 | A | * | 11/2000 | Kato et al. | 361/679.23 |
| 6,151,401 | A | * | 11/2000 | Annaratone | 361/679.23 |
| 6,181,550 | B1 | * | 1/2001 | Kim | 361/679.23 |
| 6,243,473 | B1 | * | 6/2001 | Azima et al. | 361/679.23 |
| 6,324,052 | B1 | * | 11/2001 | Azima et al. | 361/679.23 |
| 6,338,182 | B1 | * | 1/2002 | Tseng et al. | 361/679.23 |
| 6,449,146 | B1 | * | 9/2002 | Ryuuzaki | 361/679.23 |
| 6,794,798 | B2 | * | 9/2004 | Watanabe et al. | 361/679.23 |

(Continued)

FOREIGN PATENT DOCUMENTS

CA    1293954    1/1992

(Continued)

OTHER PUBLICATIONS

Search Report Dated May 11, 2007.

*Primary Examiner*—Lisa Lea-Edmonds
(74) *Attorney, Agent, or Firm*—Robert D. Shedd; Jeffrey M. Navon (57) ABSTRACT

The invention concerns to a display device comprising a flat screen, a cabinet and at least one mobile arm capable of taking up first and second positions:
  in the first position, one end of the mobile arm or mobile arms is space apart from a plane corresponding to the front surface of the screen along a horizontal direction, one part at least of the arm or arms being adapted to maintain the screen in a noticeably vertical position when the device is resting on a horizontal plane, and
  in the second position, the arm(s) are in the space between the planes parallel to the screen and tangent respectively to the front and to the rear of the cabinet.

20 Claims, 5 Drawing Sheets

U.S. PATENT DOCUMENTS

| | | | | |
|---|---|---|---|---|
| 7,034,902 B2* | 4/2006 | Tajima | ............ | 361/679.23 |
| 7,136,281 B2* | 11/2006 | Yang | ............ | 361/679.23 |
| 7,140,584 B2* | 11/2006 | Bourque et al. | ............ | 248/274.1 |
| 7,221,563 B2* | 5/2007 | Liu | ............ | 361/679.21 |
| 7,251,125 B2* | 7/2007 | Heckerman | ............ | 361/679.27 |
| 2002/0186528 A1* | 12/2002 | Huang | ............ | 361/683 |
| 2004/0240167 A1* | 12/2004 | Ledbetter et al. | ............ | 361/683 |
| 2005/0063148 A1* | 3/2005 | Tago | ............ | 361/683 |
| 2005/0097797 A1 | 5/2005 | Wang et al. | | |
| 2006/0028791 A1 | 2/2006 | Huang et al. | | |

FOREIGN PATENT DOCUMENTS

DE 19637476 3/1997

\* cited by examiner

Fig 11 ically to the bottom of the device. In the set down position, one handle is positioned toward the front and another toward the back. Hence, these devices have the disadvantage of being relatively cumbersome, whether this is in the set down position or with the handles enabling them to be carried.

SUMMARY OF THE INVENTION

The purpose of the invention is to overcome the disadvantages of the prior art.

More particularly, the invention has the goal of improving the ergonomics of a flat-screen display system so that it may be easily set down or mounted on a wall while having limited size in the set down or hanging position.

The invention relates to a display device comprising a flat screen, a cabinet and at least one mobile arm being able to take first and second positions:

in the first position, one extremity of the mobile arm or mobile arms is distant from the plane corresponding to the front face of the screen according to a horizontal direction, one part at least of the arm or arms being suitable to support the screen in a noticeably vertical position when the device is resting on a horizontal plane, and in the second position, the arm or arms are in the space between the planes parallel to the screen and tangent respectively to the front and to the back of the cabinet.

According to a particular characteristic, the device comprises two mobile arms.

According to an advantageous characteristic, it comprises at least one loudspeaker associated with each of the mobile arm or arms, each loudspeaker being fixed at a first extremity of the mobile arm that is associated with it.

Preferentially, the height of each of the speakers associated with a mobile arm is noticeably equal to the height of the screen.

FLAT SCREEN DISPLAY DEVICE

This application claims the benefit, under 35 U.S.C. §365 of International Application PCT/EP2006/065655, filed Aug. 24, 2006 which was published in accordance with PCT Article 21(2) on May 31, 2007 and re-published on Jul. 5, 2007 in French and which claims the benefit of French patent application No. 05 52651 filed Sep. 1, 2005.

SCOPE OF THE INVENTION

The present invention relates to the field of screens and more specifically to the positioning of flat screens, for example of the liquid crystal type or LCD (Liquid Crystal Display), on a plane.

PRIOR ART

According to the prior art, flat screens can be mounted on a wall or set on a plane. Such a screen is, for example, described in patent application US2004/0084588.

The transfer from a set down position to a hanging position or position suitable for transport generally requires a complex operation, especially when installing and/or removing a support attached to the back of the screen. This operation presents the disadvantage of being relatively cumbersome to carry out and requires a complicated and/or cumbersome support.

The patent document US2005/0097797 describes devices with a screen, featuring handles that fold or unfold around a horizontal axis, parallel Advantageously, the facade of each of the speakers is in the plane of the facade of the screen when the arm that is associated with it is in the second position.

According to a preferred characteristic, each of the mobile arms and the cabinet comprise rotation means of each of the mobile arms with respect to the screen.

According to an advantageous characteristic, the rotation means comprise a support and a mobile ball joint inserted into the support, the ball joint being mobile in rotation with respect to the support.

Preferentially, the rotation means comprise guiding means of each of the mobile arms.

According to another advantageous characteristic, the rotation means comprise a support and a rotation axis inserted into the support, the rotation axis being mobile in rotation with respect to the support.

When the device comprises two arms, the rotation means advantageously comprises synchronisation means of the rotation such that the two arms move in a synchronous manner.

Said synchronisation means comprise, for example, at least one partly toothed wheel.

Preferentially, each of the mobile arms and the cabinet comprise limitation means of the travel of the mobile arms that comprises, for example, a stop.

Advantageously, each of the mobile arms or the cabinet comprises blocking means of the mobile arms in the first and/or second position.

According to a particular characteristic, each of the mobile arms comprises a plate linking the two extremities of the arm, and when the mobile arms are in the first position, the plate rests on the horizontal plane.

Advantageously, the façade of the screen is tilted backward when the arms are in the first position, the angle formed by the lower face of the arms resting on the ground and the facade being strictly less than 90°.

According to preferred characteristic, each of the mobile arms is linked to the lower part of the screen.

According to a particular characteristic, the device belongs to the group comprising computer monitors and television sets.

The invention also relates to the corresponding support.

LIST OF FIGURES

The invention will be better understood, and other specific features and advantages will emerge from reading the following description, the description making reference to the annexed drawings wherein.

DETAILED DESCRIPTION OF THE INVENTION

The general principle of the invention is thus based on a flat screen display device, comprising at least two mobile arms in folded position during transport of the display device or when it is hanging on a wall, and in unfolded position when the display device rests on a plane (for example, a table or item of furniture).

Hence, when the system goes from a transport or hanging position to being set on a horizontal plane, the user can easily unfold the mobile arm or arms to ensure the stability of the screen. Conversely, when the system goes from being set on a horizontal plane to a transport or hanging position, the user can easily fold the arm or arms, the device not being cumbersome (for transport) in this configuration and furthermore easy to hang. This architecture provides the user with flexibility in terms of choice of installation.

Figure 1:
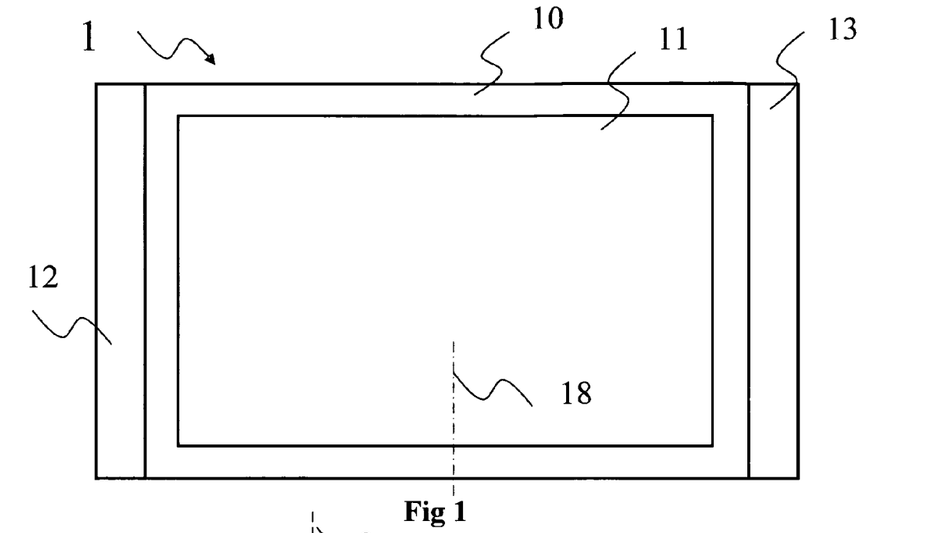
FIGS. 1 to 3 illustrate a display device according to a particular embodiment of the invention according to views respectively front, side and top, the display device being in a flat position.

FIG. 1 diagrammatically illustrates a front view of a display device 1 in a flat position or folded according to a preferred embodiment of the invention, this position enabling easy transport (the cumbersomeness of the device being relatively low) and/or easy hanging on a vertical wall. The display device is, for example, a television set or a computer monitor.

The display device 1 comprises:

a cabinet 10 surrounding a flat screen 11 on the façade, two lateral loudspeakers 12 and 13.

In the folded position, the loudspeakers 12 and 13 that have a height equal to the cabinet 10 are adjacent to the cabinet 10. Hence, the cumbersomeness of the devices is relatively reduced. According to a variant embodiment, the speakers are less high than the cabinet 10, their height preferentially being greater than half of the height of the cabinet 10.

According to a variant of the invention, the loudspeakers have a different height from the height of the cabinet. In particular, they can have a height less than the height of the cabinet and, for example between 80 and 90 mm.

The flat screen 101 is, for example, an LCD screen or a plasma-type screen. The device can also be an overhead projector of low thickness.

According to a variant not illustrated, the cabinet 10 comprises one or more additional speakers (for example one or more speakers dedicated to the bass) under the screen.

Figure 2:
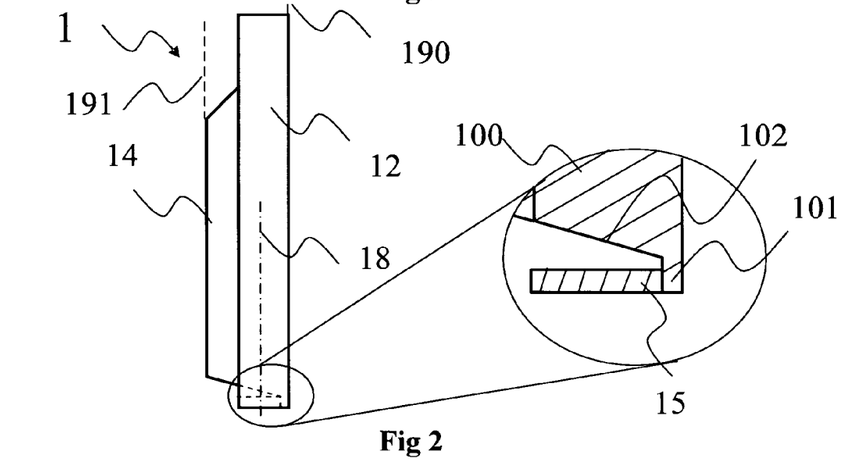

As illustrated on the side view in FIG. 2, the cabinet 10 comprises on its rear part a cover 14 making it possible to house, notably, the electronic parts, the power supply and the connectors (power supply, audio/video connection cables) necessary for the operation of the screen.

The device 1 also comprises the mobile arms 15 and 16. In a bubble relative to FIG. 2, an enlarged view of a cross-section of the lower part of the cabinet 10 is shown diagrammatically. This part notably comprises a projecting element 101 on the facade that notably enables the mobile arms 15 and 16 to be concealed and a lower face 102 preferentially contiguous and tangent to the lower face of the cover 14 and which enables the device 1 to rest on the ground when the arms 15 and 16 are unfolded.

In the folded position, the mobile arms 15 and 16 are between two planes parallel to the screen 11 and tangent respectively to the front (190) (or the façade of the screen 11) and to the back (191) of the cabinet (or cover 14).

According to a variant of the invention, the arms 15 and 16 and/or the loudspeakers comprise support means to prevent the arms from bending when the device is hung on a wall. These support means are mechanical means, for example, of the lug type located near the mobile extremity of each of the arms and/or at the top of the loudspeakers and that are fixed for example in a lug attached to the cabinet 12 or to the cover 14. It may also involve magnetic means (for example magnets) located near the mobile extremity of the arms and/or top of the loudspeakers and/or on the cover or the cabinet. These support means or similar means can also be used to support the arms in the folded position when the display device is hanging or during transport.

Figure 3:
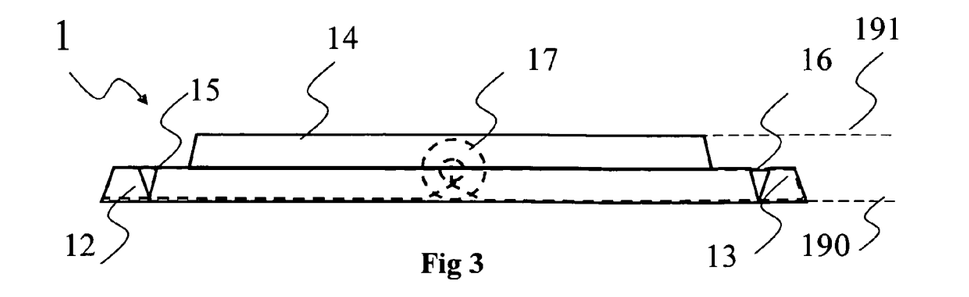

FIG. 3 shows a top view of the device 1 of the arms comprises a rigid plate that connects a link mechanism 17 associated with the cabinet 10 to one of the speakers 12 or 13.

Preferentially, the link mechanism 17 and the arms 15 and 16 in the folded position are located in the lower part of the cabinet 10 and are not visible on the facade.

The speakers 12 and 13 are fixed in a rigid manner to the arms respectively 15 and 16. As shown on FIG. 3, the façade of each of the speakers 12 and 13 is in the plane of the façade of the screen 11 when the arm that is associated with it is in the folded position.

Figure 4:
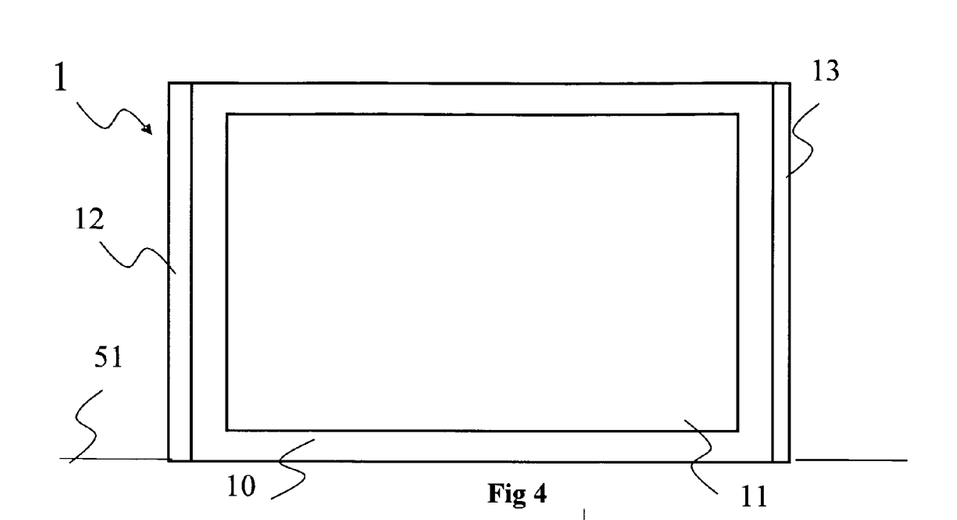
FIGS. 4 to 6 show the display device of FIGS. 1 to 3, according to views respectively front, side and top, the display device being set down on a plane, FIG. 7 describes a support of the display device of FIGS. 1 to 6, FIGS. 8 and 9 show a display device according to a variant embodiment of the invention.
Figure 5:
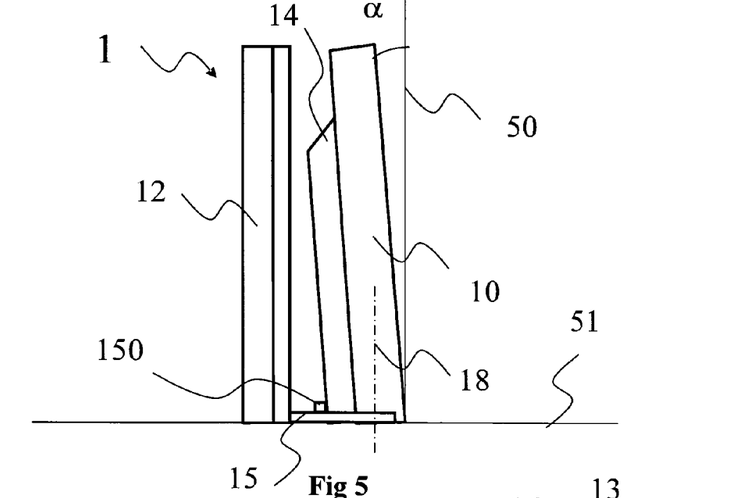
Figure 6:
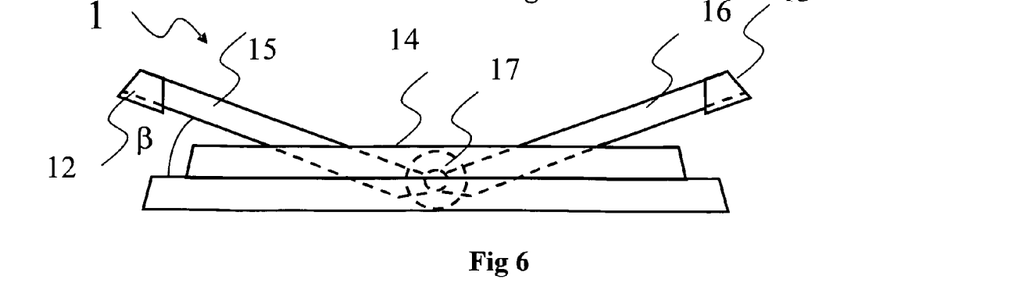

According to the FIGS. 4 to 6 illustrating the device 1 in a set down position on a horizontal plane, the mobile arms 15 and 16 are unfolded backward by an angle $\beta$ with respect to their folded position, the arms being distant from the screen according to a horizontal direction to go from the unfolded position to the folded position or vice versa.

In the mode of use of the display device 1 on a noticeably horizontal plane, the base of the cabinet 11 and the mobile arms 15 and 16 rest on the ground. The loudspeakers being located at the back of the cabinet, they enable, owing to their weight, the centre of gravity of the device 1 to be moved back and thus the stability of the device resting on a horizontal plane to be improved.

Moreover, in folded position, the mobile arms 15 and 16 are positioned behind the façade of the unit 11 such as not to be seen by the viewer, which improves the ergonomics of the device 1 and allows the cabinet to be left resting on the plane when the mobile arms are unfolded.

Preferentially, when the mobile arms 15 are unfolded, the façade of the cabinet is slightly inclined at an angle $\alpha$ with respect to the vertical 50 so as to improve the stability of the device 1 when it is set down on a horizontal plane 51. This noticeably vertical position corresponds moreover to a position of comfort enabling a viewer located in front of the screen to have a correct view.

Preferentially, the mobile arms 15 and 16 comprise the link cables that transport the acoustic signals and possibly an electric power supply of the cabinet 10 at each of the speakers respectively 12 and 13. Advantageously, these cables are inserted into the mobile arms 15 and 16 for ergonomic reasons and/or ease of implementation.

Advantageously, one of the mobile arms or both comprise a lug 150 that enables the travel of the arms to be limited and/or the support of the arms in unfolded position to be improved, the cover 14 and/or the cabinet 10 stopping against the lug 150. Said lug must by sufficiently small so as not to hinder the movement of the mobile arms 15 and 16 when they are unfolded and, possibly, enable their return to a folded position.

In a general manner and preferentially, each of the arms 15 and 16 and/or the cabinet comprising blocking means of the arms in the unfolded and/or folded position. These blocking means can be mechanical, for example, of the clips, lugs or slots type located in each of the arms, the two arms being blocked in the unfolded position when their respective mobile extremity is close, their blocking means being associated (in this case, the arms are joined in the unfolded position). According to a variant, the cabinet also comprises blocking means that are associated with the blocking means of the arms when these arms are unfolded. It can also involve magnetic means (for example, magnets). Nevertheless, these means are optional, the weight of the cabinet 10 and the cover 14 helping to support the arms in an unfolded position.

These blocking means or similar means can also be used to support the arms in the folded position when the display device is hanging or during transport.

Figure 7:
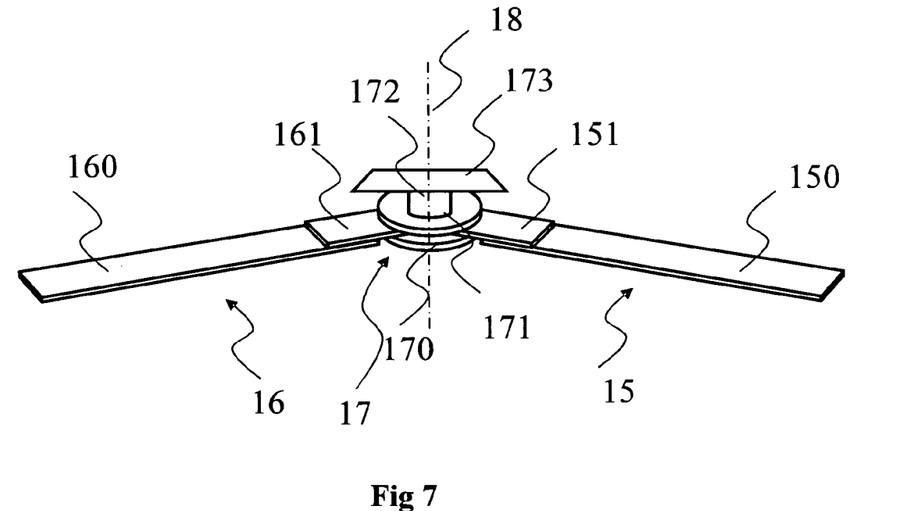

FIG. 7 shows a perspective view of the support of the cabinet 10 and speakers 12 and 13, said support comprising the arms 15 and 16 as well as the link mechanism 17.

The arm 15 (respectively 16) comprises:
- a plate 150 (respectively 160) designed to rest on the ground and whose free extremity comprises fixation means for the speaker 12 (respectively 13) for example of the screw or glue type, and
- a plate 151 (respectively 161).

The link mechanism 17 comprises:
- a plate 170 designed to rest on the ground of the same thickness as the plate 150,
- a plate 171,
- a cylindrical part 172 in which are successively inserted the plate 170, the plates 151 and 161, the plate 171, the plates 151 and 161 being able to pivot around the cylindrical part 171,
- a rectangular attachment plate 173 integral with the cylindrical part 171 and to which the cabinet 10 is attached, for example, by means of screws.

The rotation axis 18 of the plates 151 and 161 is perpendicular to the arms; the rotation axis 18 is inclined with respect to the plane at the facade of the screen 11 when the arms are unfolded. Hence, when the arms 15 and 16 are folded, their base is adjacent to the bottom of the cabinet 10 and when they are unfolded at an angle β (according to horizontal plane) with the plane of the screen 11, the screen in tilted backward at an angle α preferentially between 2° and 6° and yet more preferentially equal to 4°.

As an illustration, β is equal to 30° and is preferentially between 25° and 45°.

The depth of the cabinet 10 is, for example, equal to 40 mm for a screen 11 of 26". The width of each of the plates 151 and 161 is less than the depth of the cabinet and for example equal to 30 mm and preferentially between 25 and 40 cm; their thickness is, for example, equal to 5 mm and preferentially between 5 and 8 mm; these dimensions enable a correct rigidity and stability to be provided. The length of the plates 151 and 161 depends on the width of the cabinet 10 and the distance between the axis 18 and their free extremity is preferentially less than half of the width of the cabinet 10 to which is added the width of the speaker 12 or 13, such that the speaker 12 or 13 is adjacent to the cabinet 10 in folded position.

Preferentially, the thickness of the plates depends on the proportions of the screen; nevertheless, for a screen of greater size the thickness of the plates is preferentially less than or equal to 10 mm.

The plates 151 and 161 are, for example, in metal or plastic (possibly with a more rigid core). Hence, the support is relatively economical and simple to produce, which can allow for a significant reduction in production costs in comparison with the supports of the prior art.

According to a variant embodiment of the invention, the plates 151 and 161 and/or the link mechanism 17 are ballasted, which enables the stability of the device 1 to be improved when it is set down on a plane, the mobile arms being unfolded and/or the inclination angle α of the screen 11 to be reduced.

Figure 8:
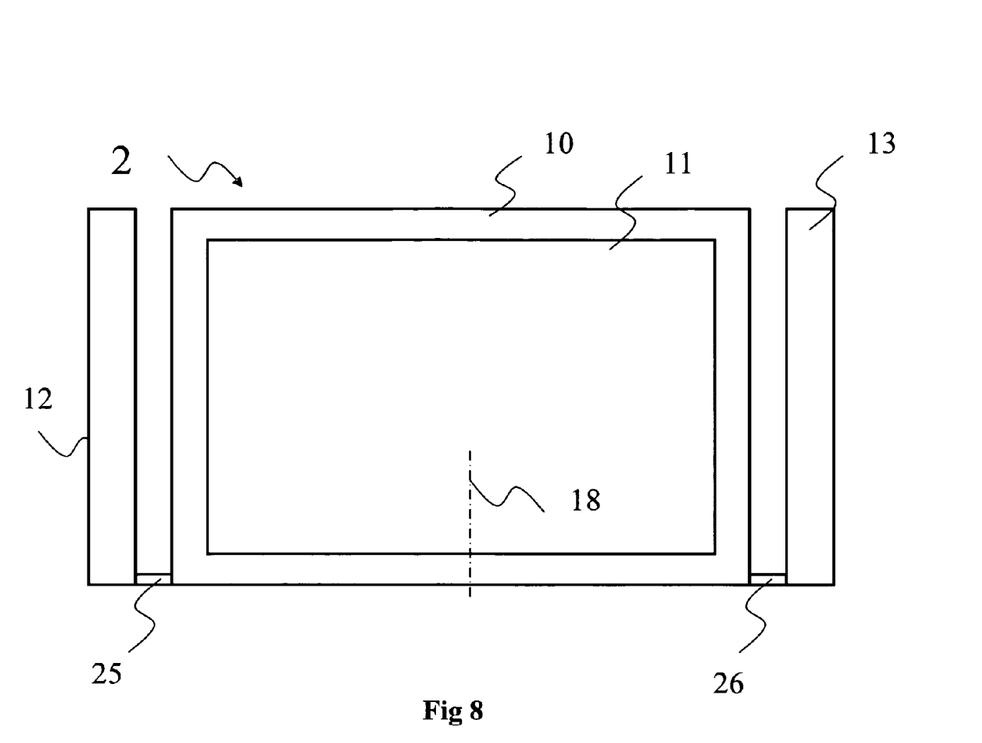
Figure 9:
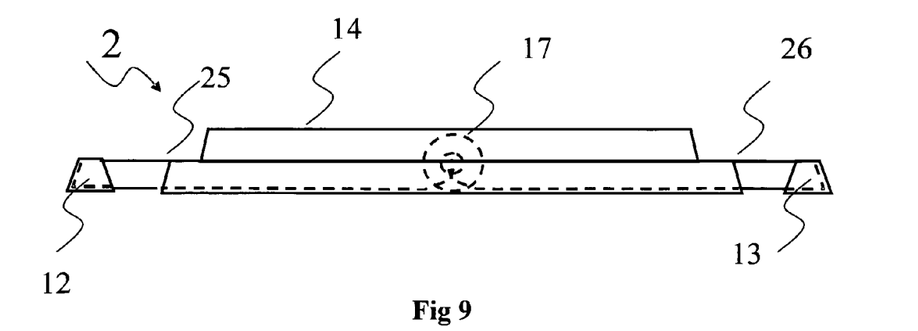

FIGS. 8 and 9 illustrate a display device 2 according to a variant of the invention, respectively following a front view and a top view in folded position.

The devices 1 and 2 basically differ in their mobile arms, the other elements being common to the devices 1 and 2, have the same references and will not be further described.

The mobile arms 25 and 26 of the device 2 are, indeed, longer than the mobile arms 15 and 16 of the device 1. Thus, the speakers 12 and 13 are distant from the cabinet 10 (for example by 8 cm and preferentially between 5 and 15 cm), which enables the acoustics of the device 2 to be improved when, particularly the mobile arms are unfolded.

In the folded position, the mobile arms 25 and 26 are between two planes parallel to the screen and tangent respectively to the front of (or the façade of the screen) and to the back of the cabinet (or of the cover 14).

Figure 10:
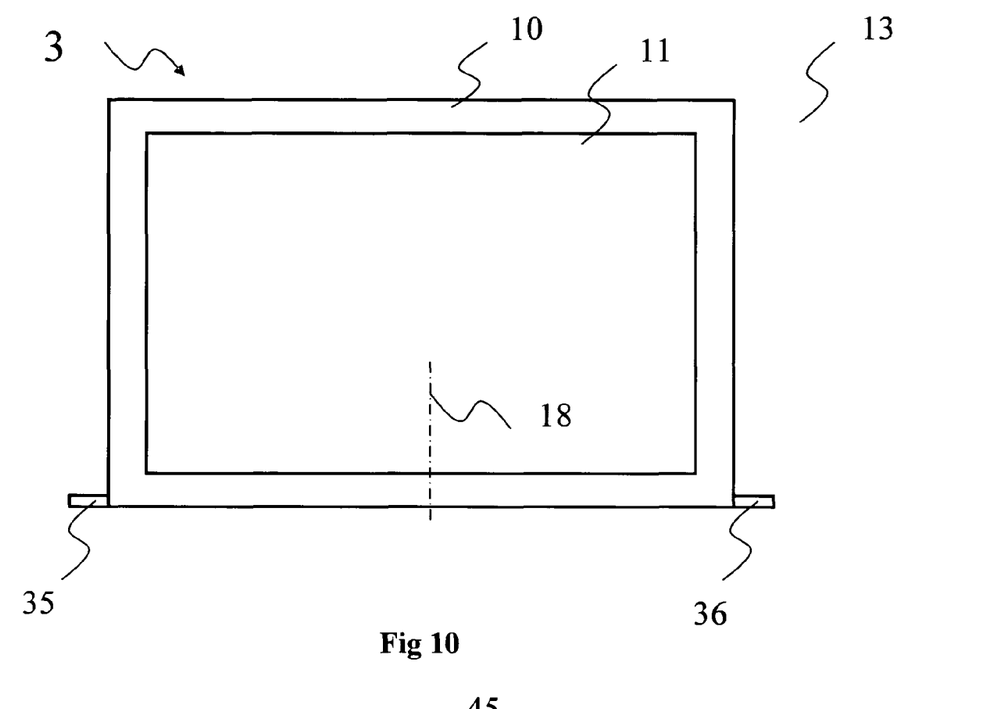
FIGS. 10 to 13 illustrate other variants of the display device according to the invention.

FIG. 10 reveals a display device 3 according to a variant of the invention according to a front view.

In contrast with the devices 1 and 2, the device 3 does not have a mobile speaker fixed to each of the arms 35 and 36 (the device 3 does not have any loudspeaker or they are built into the cabinet). The other elements being common to the devices 1, 2 and 3 have the same names and references and will not be described in further detail.

In order to make the representation easier, the arms 35 and 36 are of the same length as the arm 15 and 16 in FIG. 10. Nevertheless, preferentially, they do not overshoot the cabinet 10. The distance between their axis 18 and their free extremity is therefore less than the half-width of the cabinet 10.

Figure 11:
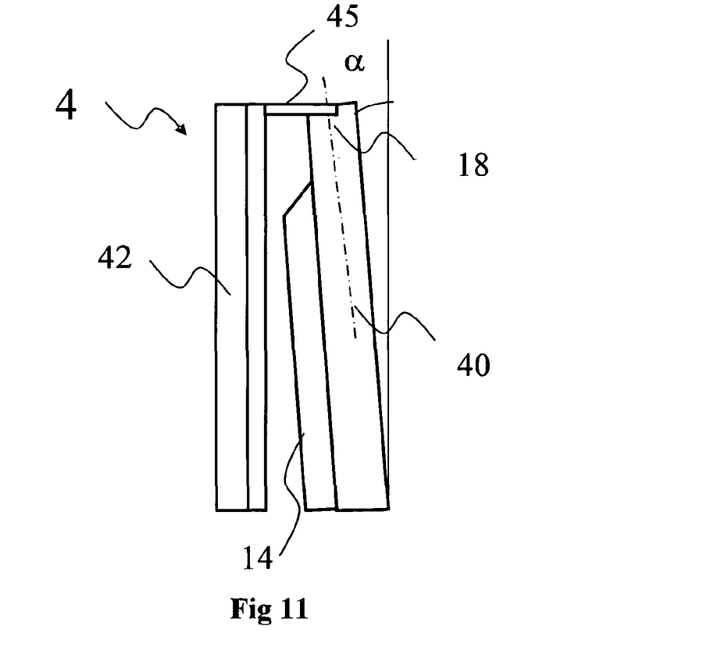

FIG. 11 shows a display device 4 according to a variant of the invention according to a side view.

According to this variant, of the mobile arms 45 and 46 are connected to a cabinet 40 by a linking mechanism positioned on the upper part of the cabinet 40 (this mechanism being moreover similar to the linking mechanism 17 described previously). The mobile arms 45 and 46 respectively support loudspeakers 42 and 43 respectively left and right, the upper part of each of the loudspeakers being fixed to a mobile arm. Hence, when the mobile arms 45 and 46 are unfolded, they support the screen in a noticeably vertical position (and preferably slightly inclined backward at an angle α as previously described) when the device 4 rests on a horizontal plane, the lower part of the cabinet 40 and the speakers 42 and 43 resting on the plane and providing the stability of the assembly.

In the folded position, the mobile arms 45 and 46 are between two planes parallel to the screen and tangent respectively to the front of (or the façade of the screen) and to the back of the cabinet (or of the cover 14).

According to a variant, the mobile arms are fixed to the upper part of the cabinet or to an intermediate part and are not fitted with speakers. They then have a form (for example bent, or straight and inclined with respect to a horizontal plane) adapted such that, the display device resting on a horizontal plane, their free extremity also rests on this plane (the base of the cabinet also resting on the plane).

Figure 12:
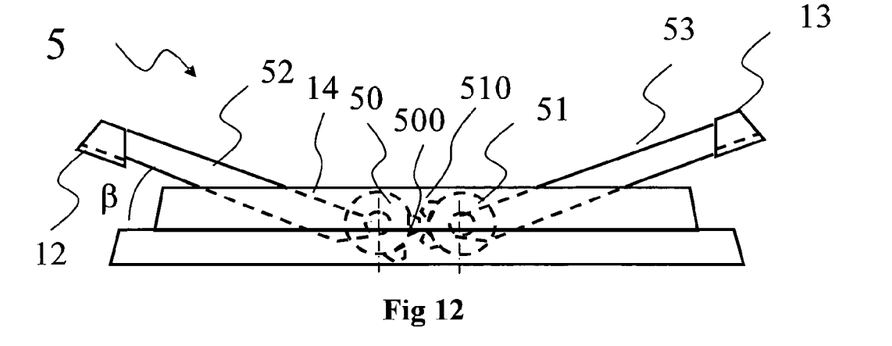

FIG. 12 shows a display device 5 according to a variant of the invention according to a top view.

According to this variant, each of the mobile arms 52 and 53 is connected to the lower part of a cabinet 50 by a linking mechanism respectively 50 and 51. Both linking mechanisms 50 and 51 (for example, similar to the mechanism 17 with similar link plates to the plates 170 and 171 connecting the two rotation axes of the mobile arms 52 and 53) preferentially comprise synchronisation means of the toothed type 500 and 510 fitting into each other to provide a synchronous movement of the two arms (mechanism similar to two notched wheels rotating simultaneously in opposite directions). Hence, the handling by a single person, enabling the transition from a position in which the arms are folded to a position in which the arms are unfolded (or vice versa), is relatively easy.

Advantageously, the linking mechanisms comprise stops limiting the travel of the arms respectively forward and backwards (these stops are for example projecting elements located on the section of the linking mechanisms 50 and 51 and which limit the travel of the arms by pressing against the opposite mechanism 50 or 51).

Preferentially, each of the arms 50 and 51 and/or the cabinet comprising blocking means of the arms in the unfolded and/or folded position. These blocking means can be mechanical, for example, of the lugs or slots type located in each of the arms, the two arms being blocked in the unfolded position when their respective mobile extremity is close, their blocking means being associated (in this case, the arms are joined in the unfolded position). According to a variant, the cabinet also comprises blocking means that are associated with the blocking means of the arms when these arms are unfolded. It can also involve magnetic means (for example, magnets). These blocking means or similar means can also be used to support the arms in the folded position when the display device is hanging or during transport.

In the folded position, the mobile arms 52 and 53 are between two planes parallel to the screen and tangent respectively to the front of (or the façade of the screen) and to the back of the cabinet (or of the cover 14).

According to a variant, the mechanisms 50 and 51 are not linked by a notched wheel mechanism and are separated from each other by a distance between, for example 0 and 10 cm. In this case, the mechanisms 50 and 51 are similar to the mechanism 17 with an adaptation to receive a single mobile arm.

Figure 13:
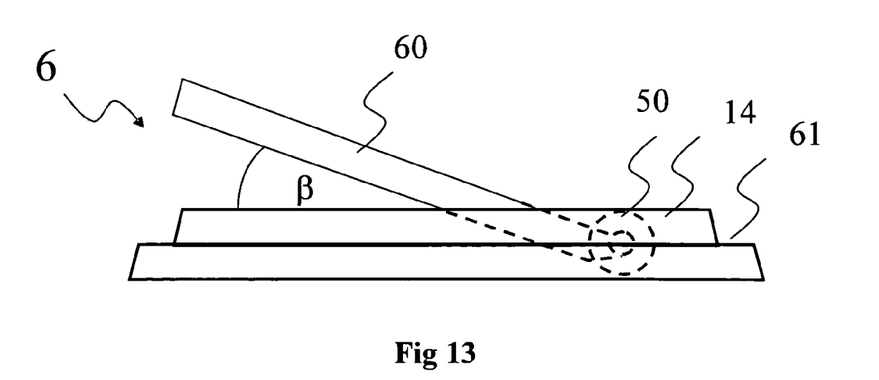

FIG. 13 shows a display device 6 according to a variant of the invention according to a top view.

According to this variant, the device 6 only comprises a single mobile arm 60 is connected to the lower part of a cabinet 61 by a linking mechanism 50 (similar to the mechanism corresponding to the device 5). Preferentially, the arm 60 does not support any loudspeaker. It is also off-centred with respect to the vertical median plane of the cabinet 61.

In the folded position, the mobile arm 60 is between two planes parallel to the screen and tangent respectively to the front of (or to the façade of the screen) and to the back of the cabinet (or of the cover 14).

Naturally, the invention is not limited to the embodiments previously described.

In particular, a person skilled in the art can implement a display device whose screen does not tip backward when the mobile arms are unfolded but on the contrary remains parallel to a given plane when the arms are unfolded. According to a variant not shown, the screen remains vertical when the arms are unfolded and rest on a horizontal ground (in other words the screen is perpendicular to the plane on which the arms rest). In this case, it is sufficient that the arms are mobile around an axis parallel to the screen.

Furthermore, the invention is not limited to attaching screens of the LCD type but relates to all flat screens, which especially have a thickness of between 30 and 50 mm.

Moreover, the invention is not limited to the attachment of display devices with screens of the LCD type but relates to all flat screen devices, that notably have an overall depth less than or equal to 100 mm, the depth of the cabinet (excluding cover) generally being less than or equal to 50 mm. In particular, the invention relates to a display system of the monitor type with a relatively small depth (for example equal to 12 mm or even 8 mm). This is particularly advantageous for viewing systems dedicated to laptop computers as transport is facilitated (reduced cumbersomeness).

The invention also relates to the display devices comprising mobile arms associated with the cabinet with a linking mechanism that does not limit to an axis and support parts, the mobile arms pivoting around this axis. In particular, the invention relates to display devices in which the link between each of the arms and the cabinet is made by means of a ball joint and its support, the movement of the arm being guided by specific means attached to the cabinet and/or to the cover. Hence, the backward tipping movement of the screen can be relatively continuous and gentle when the arms unfold. A ball joint being associated with each of the arms and a support with the cabinet (or according to a variant, a support being associated with each one of the arms and at least one ball joint with the cabinet), each ball joint inserted in the corresponding support is mobile in rotation.

According to another variant implementing at least one ball joint, the bottom of the cabinet is profiled to slide the arm or arms backward, the screen remaining perpendicular to the arms and to tip the screen backward by a small angle (to improve the stability of the assembly and/or the visual comfort of the viewer) when the arm or arms in unfolded position exceed a limit (in the profile of the cabinet thus also enables the travel of the arms to be limited and the arms to be blocked in the unfolded position).

The invention also relates to display devices where elements connected to the device are positioned at the extremity of one at least of the arms; said elements are, for example, a DVD player with a vertical drawer, a control unit of the device (for example volume setting of the sound or choice of the channels if it is a television set), means for transmitting and/or receiving information to remote equipment (for example transmitter for an infrared or high frequency headset linked, moreover, to the display device), components associated with the display device (for example components offset to the extremity of the arms if the screen is thin and/or if there is no cover or if its depth is reduced).

According to another variant, the mobile arms equipped with loudspeakers are telescopic to enable a better restitution of the sound for a viewer when the arms are unfolded.

According to yet other variants, the cross-section of the arms is unremarkable and, for instance, cylindrical or semi-cylindrical. In general, the arms comprise an extended element with an unremarkable cross-section that rests on the ground when the arms are in unfolded position.

The invention claimed is:

1. Display device comprising:
   a flat screen;
   a casing; and
   at least one mobile arm,
   the at least one mobile arm being able to take first and second positions:
   in the first position, one extremity of said mobile arm or mobile arms is distant from the plane corresponding to the front face of the screen according to a horizontal direction when the device is resting on a horizontal plane, one part at least of the arm or arms being suitable to support the screen in a noticeably vertical position, and
   in the second position, said arm or arms are in the space between the planes parallel to said screen and tangent respectively to the front and to the back of said casing.

2. Device according to claim 1, wherein it comprises two mobile arms.

3. Device according to claim 1, wherein it comprises at least one loudspeaker associated with each of said mobile arm or arms, each of said speakers being fixed to a first extremity of the mobile arm that is associated with it.

4. Device according to claim 3, wherein the height of each of said speakers associated with a mobile arm is noticeably equal to the height of said screen.

5. Device according to claim 3, wherein the façade of each one of said speakers is in the plane of the façade of said screen when the arm that is associated with it is in said second position.

6. Device according to claim 1, wherein each of said mobile arms and the casing comprise rotation means of each of said mobile arms with respect to said screen.

7. Device according to claim 6, wherein the rotation means comprise a support and a mobile ball joint inserted into the support, the ball joint being mobile in rotation with respect to the support.

8. Device according to claim 7, wherein the rotation means comprise guiding means of each of the mobile arms.

9. Device according to claim 6, wherein the rotation means comprise a support and a rotation axis inserted into the support, the rotation axis being mobile in rotation with respect to the support.

10. Device according to claim 2, wherein each of said mobile arms and the casing comprise rotation means of each of said mobile arms with respect to said screen and wherein the rotation means comprise synchronisation means of the rotation such that the two arms move in a synchronous manner.

11. Device according to claim 7, wherein said synchronisation means comprise, for example, at least one partly toothed wheel.

12. Device according to claim 1, wherein each of said mobile arms and the casing comprise limitation means of the travel of said mobile arms.

13. Device according to claim 12, wherein said limitation means of the travel of said mobile arms comprise a stop.

14. Device according to claim 1, wherein each of said mobile arms or the casing comprise blocking means of said mobile arms in the first and/or the second position.

15. Device according to claim 1, wherein each of said mobile arms comprises a plate linking the two extremities of said arm, and in that when said mobile arms are in said first position, said plate rests on said horizontal plane.

16. Device according to claim 1, wherein the façade of the screen is tilted backward when said arms are in said first position, the angle formed by the lower face of the arms resting on the ground and the façade being strictly less than 90°.

17. Device according to claim 1, wherein each of said mobile arms is linked to the lower part of the screen.

18. Device according to claim 1, wherein it belongs to the group comprising computer monitors and television sets.

19. Device according to claim 1, wherein, in the first position, one part at least of the arm or arms is suitable to support the screen in a tilted position of an angle to the vertical, between 2° and 6°, when the device is resting on a horizontal plane.

20. Device according to claim 1, wherein, in the first position, one extremity of said mobile arm or mobile arms is distant from the plane corresponding to the front face of the screen, the arms making an angle between 25° and 45° according to a horizontal plane, when the device is resting on a horizontal plane.

* * * * *